(12) United States Patent
Chinen et al.

(10) Patent No.: US 7,702,131 B2
(45) Date of Patent: Apr. 20, 2010

(54) SEGMENTING IMAGES AND SIMULATING MOTION BLUR USING AN IMAGE SEQUENCE

(75) Inventors: Troy Chinen, Fremont, CA (US);
Sergey Ioffe, Mountain View, CA (US);
Thomas Leung, San Jose, CA (US);
Yang Song, San Jose, CA (US)

(73) Assignee: Fujifilm Corporation, Tokyo (JP)

( * ) Notice: Subject to any disclaimer, the term of this patent is extended or adjusted under 35 U.S.C. 154(b) by 1224 days.

(21) Appl. No.: 11/248,175

(22) Filed: Oct. 13, 2005

(65) Prior Publication Data

US 2007/0086675 A1    Apr. 19, 2007

(51) Int. Cl.
*G06K 9/00* (2006.01)
*G06K 9/36* (2006.01)
*H04N 9/47* (2006.01)

(52) U.S. Cl. .................. 382/103; 382/190; 382/287; 348/94; 348/152

(58) Field of Classification Search ............. 382/100, 382/103, 164, 172–180, 190–201, 236, 276–278, 382/284–295; 348/14.14, 14.15, 94–95, 348/152, 155, 169–172
See application file for complete search history.

(56) References Cited

U.S. PATENT DOCUMENTS

| | | | |
|---|---|---|---|
| 5,014,126 A * | 5/1991 | Pritchard et al. ............. 348/42 |
| 5,125,041 A | 6/1992 | Kimura et al. | |
| 5,150,426 A * | 9/1992 | Banh et al. ................ 382/103 |
| 5,253,065 A | 10/1993 | Richards et al. | |
| 5,343,241 A | 8/1994 | Richards et al. | |
| 5,613,048 A | 3/1997 | Chen et al. | |
| 5,751,376 A | 5/1998 | Hirai | |
| 5,831,627 A | 11/1998 | Cohen | |
| 6,097,396 A | 8/2000 | Rouet et al. | |
| 6,211,882 B1 | 4/2001 | Pearce et al. | |
| 6,426,755 B1 | 7/2002 | Deering | |
| 6,529,193 B1 | 3/2003 | Herken et al. | |
| 6,559,849 B1 | 5/2003 | Anderson et al. | |
| 6,654,020 B2 | 11/2003 | Mori | |
| 7,522,186 B2 * | 4/2009 | Arpa et al. ................ 348/153 |
| 2002/0126138 A1 | 9/2002 | Shekter | |
| 2003/0001862 A1 | 1/2003 | Chu et al. | |
| 2003/0063259 A1 | 4/2003 | Huber | |

(Continued)

OTHER PUBLICATIONS

Image Thresholding, retrieved Jan. 12, 2006 from http://www.music.mcgill.ca/~ich/research/binarization.html (2 pages).

(Continued)

*Primary Examiner*—Manav Seth
(74) *Attorney, Agent, or Firm*—Birch, Stewart, Kolasch & Birch, LLP

(57) ABSTRACT

A sequence of images depicts a foreground object in motion. A base image is selected, and the other images in the sequence are co-registered with the base image in order to align the images to a common coordinate system. A background image and a binary foreground mask are generated from the sequence of aligned images. By applying the foreground mask to a chosen one of the aligned images, a representation of the moving object is extracted. After blurring the background image, the extracted representation may be superimposed onto the blurred background image to produce a new image.

20 Claims, 11 Drawing Sheets

U.S. PATENT DOCUMENTS

| | | | |
|---|---|---|---|
| 2003/0164882 A1 | 9/2003 | Kondo et al. | |
| 2003/0234789 A1 | 12/2003 | Gritz | |
| 2003/0234791 A1 | 12/2003 | Boyd et al. | |
| 2004/0105493 A1* | 6/2004 | Kondo et al. | 375/240.08 |
| 2004/0126014 A1* | 7/2004 | Lipton et al. | 382/173 |
| 2004/0170327 A1* | 9/2004 | Kim et al. | 382/217 |
| 2004/0196299 A1* | 10/2004 | Di Lelle et al. | 345/619 |
| 2005/0243323 A1* | 11/2005 | Hsu et al. | 356/450 |
| 2005/0259870 A1* | 11/2005 | Kondo et al. | 382/173 |
| 2006/0171584 A1* | 8/2006 | Sandrew | 382/162 |
| 2007/0160289 A1* | 7/2007 | Lipton et al. | 382/173 |
| 2007/0183676 A1* | 8/2007 | Hannuksela et al. | 382/243 |
| 2007/0279494 A1* | 12/2007 | Aman et al. | 348/169 |
| 2008/0095435 A1* | 4/2008 | Lipton et al. | 382/173 |
| 2008/0181487 A1* | 7/2008 | Hsu et al. | 382/154 |
| 2008/0205783 A1* | 8/2008 | Sandrew | 382/254 |

OTHER PUBLICATIONS

Morse, Bryan S., "Lecture 4: Thresholding," Brigham Young University, 1998-2000, pp. 1-5.

Otsu, Nobuyuki, "A Threshold Selection Method form Gray-Level Histograms," IEEE Transactions on Systems, Man, and Cybernetics, vol. 9, No. 1, Jan. 1979, pp. 62-66.

Lowe, David G., "Object Recognition from Local Scale-Invariant Features," Proc. of the International Conference on Computer Vision, Corfu, Sep. 1999, pp. 1-8.

Mikolajczyk, Krystian et al., "A Performance Evaluation on Local Descriptors," Draft, Oct. 6, 2004, pp. 1-33.

Fischler, Martin A. et al., "Random Sample Consensus: A Paradigm for Model Fitting with Applications to Image Analysis and Automated Cartography," Communications of the ACM, vol. 24, No. 6, Jun. 1981, pp. 381-395.

Lowe, David G., "Distinctive Image Features from Scale-Invariant Keypoints," Jan. 5, 2004, pp. 1-28.

Rosin, Paul L. et al., "Image Difference Threshold Strategies and Shadow Detection," (10 pages).

"Statistical Approach of Background Estimation and Shadow Removal Based on the Decomposing of Color Changes," retrieved Apr. 28, 2005 from http://www.cs.washington.edu/homes/yi/research2/vs/bg_estimation/ (2 pages).

Bevilacqua, Alessandro et al., "An Efficient Change Detection Algorithm based on a Statistical Non-Parametric Camera Noise Model," IEEE, 2004, pp. 2347-2350.

Gutchess, D., "A Background Model Initialization Algorithm for Video Surveillance," IEEE, 2001, (6 pages).

* cited by examiner

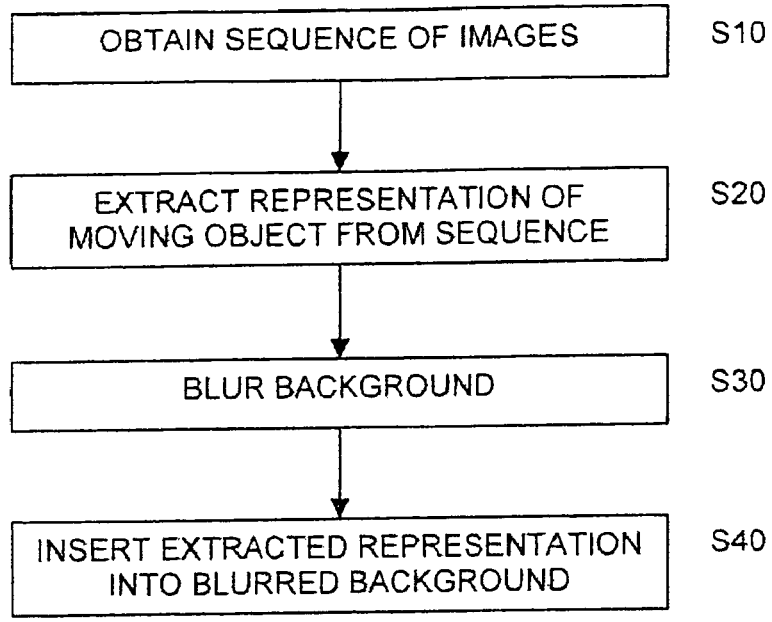
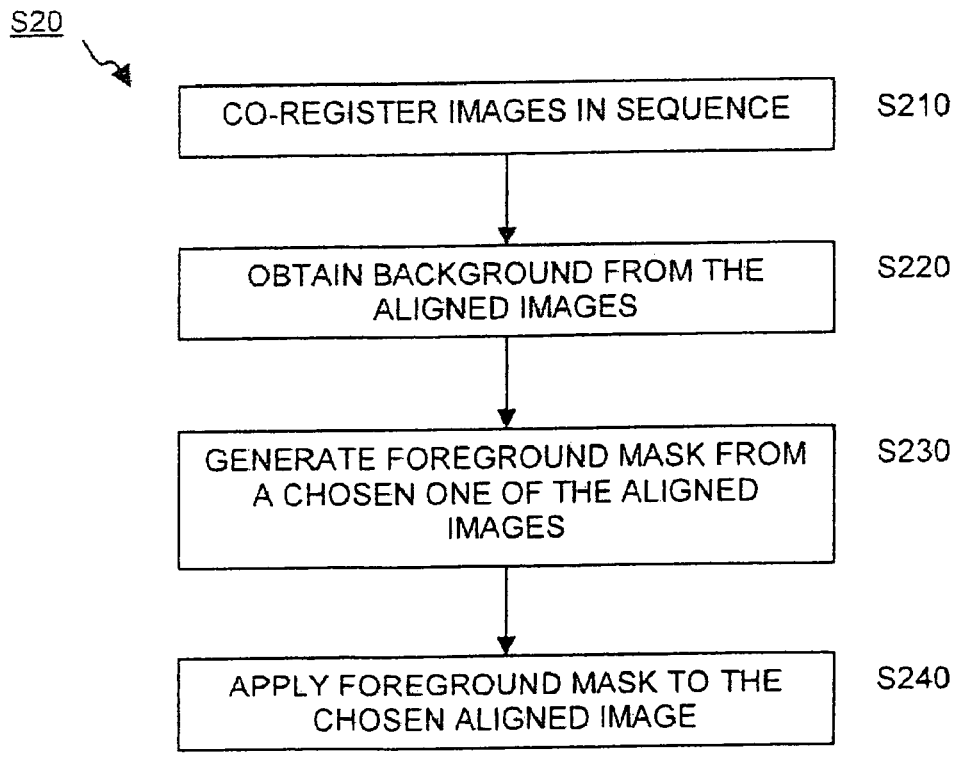

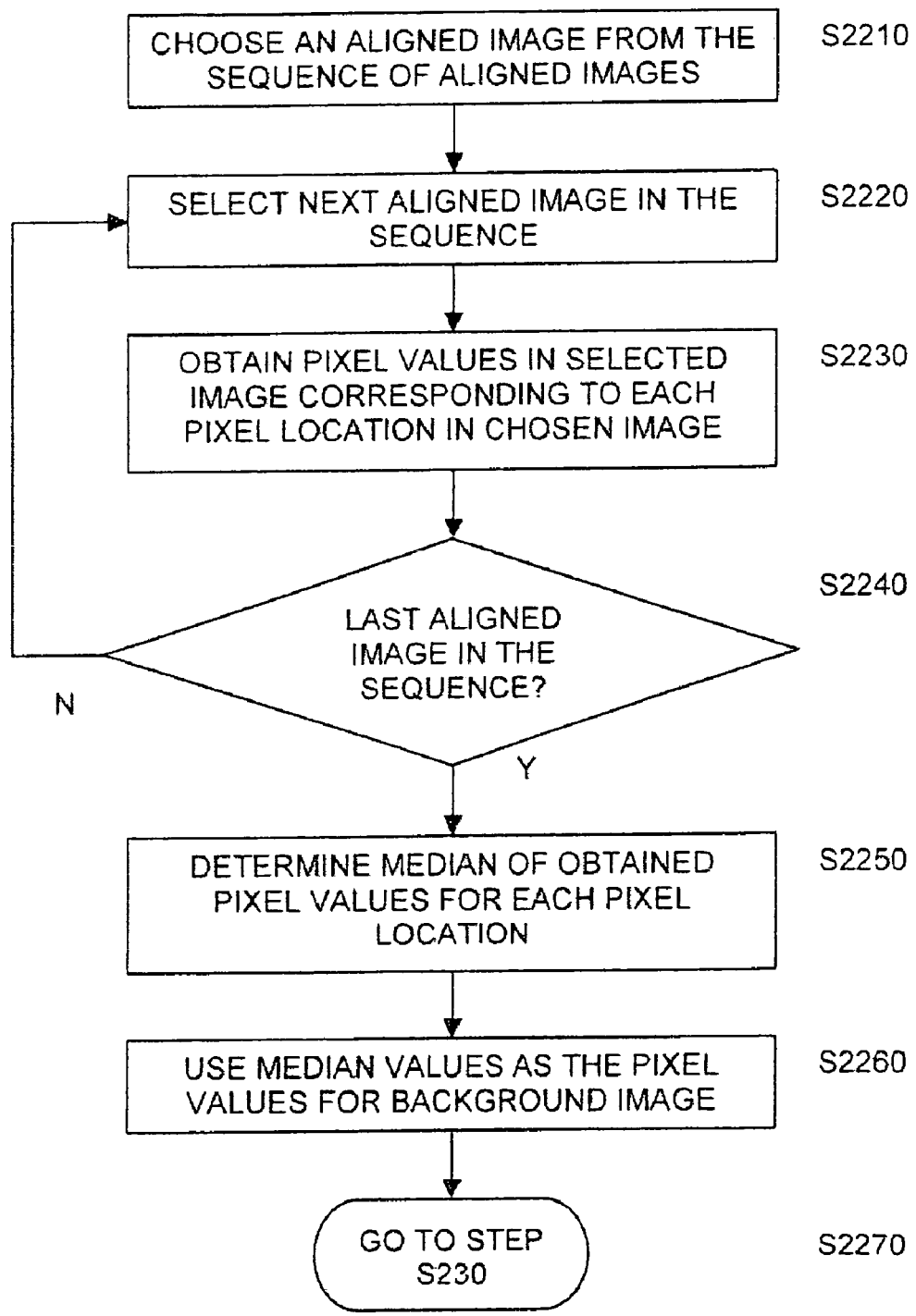

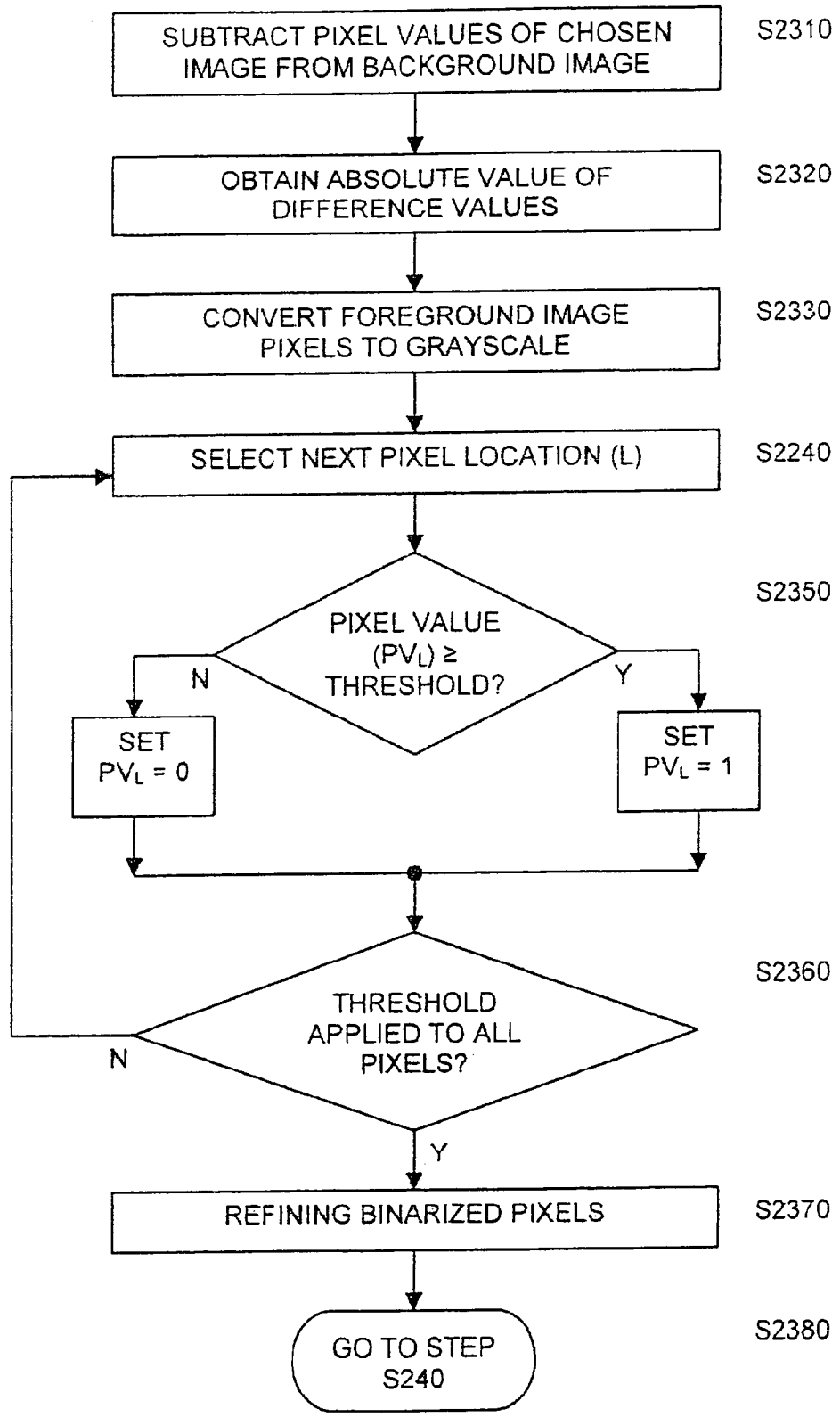

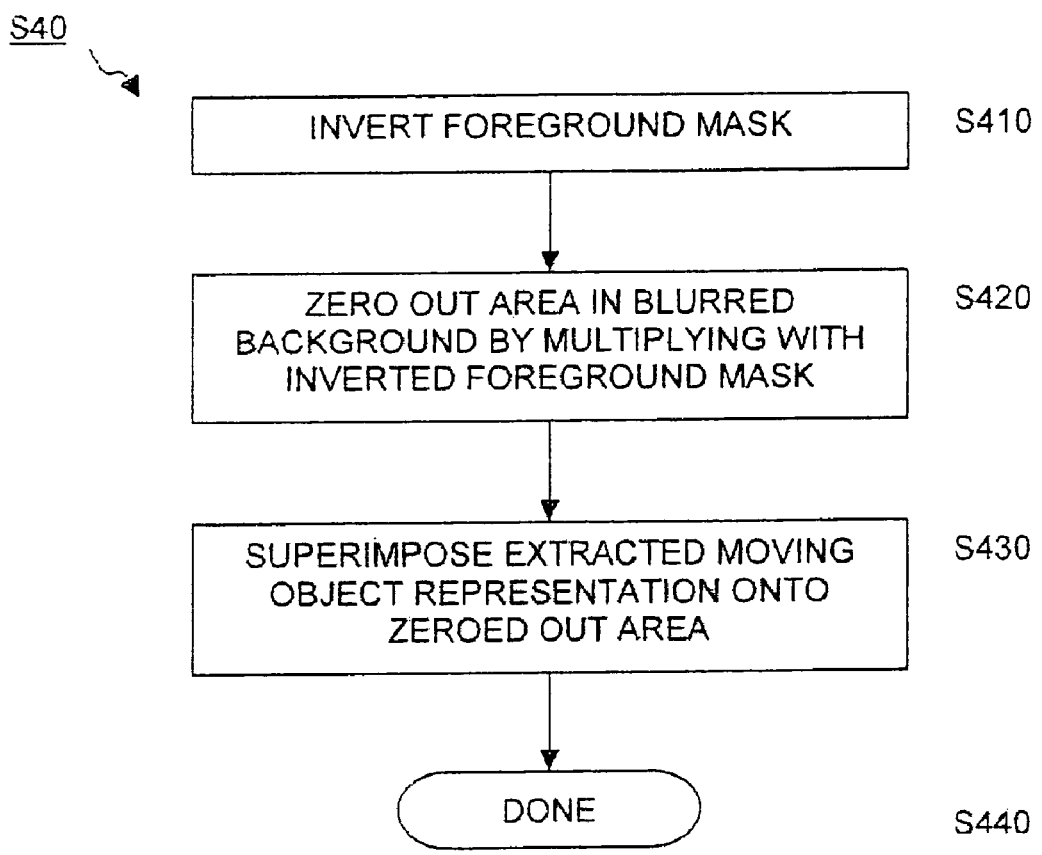

SEGMENTING IMAGES AND SIMULATING MOTION BLUR USING AN IMAGE SEQUENCE

FIELD OF THE INVENTION

The present invention is directed to the processing of digital video images and, more particularly, to processing a sequence of digital images to extract or segment a foreground object. Once segmented, the invention may also apply visual effects to the background.

BACKGROUND OF THE INVENTION

Most digital cameras now have the capability of capturing several images in rapid succession. Thus, such cameras can be used to obtain a sequence of images of a moving object (e.g., an automobile) traveling through a particular scene (e.g., a segment of a roadway).

Existing digital image processing systems attempt to process a sequence of images in order to create a visual effect connoting motion. For example, after capturing a time sequence of digital photographic images, some systems attempt to generate a new photorealistic image in which blurring is applied either to the moving object or to the entire image (moving object and background) in order to give the appearance of motion.

Other systems attempt to use computer graphics (CG) in order to generate visual representation of a new scene. Such CG systems may also implement various visual effects in the generated scene in order to illustrate certain types of motion. However, CG related systems generally create a scene, which is not photorealistic. In other words, such systems do not use photographic images as the main source of data from which to produce the output image of the scene.

As such, none of the existing imaging systems described above addresses the problem of identifying and isolating a moving foreground object from a sequence of photographic-quality images. Also, none of these systems have addressed the problem of, given a series of digital photographic images of a moving object, creating a new image containing a sharp representation of the object while conveying the appearance of motion by blurring the background. Furthermore, existing systems generally assume that the input sequence of images are already co-registered which will never be the case for images acquired using a handheld digital camera.

BRIEF DESCRIPTION OF THE DRAWINGS

A more complete understanding of the present invention will become apparent from the following description taken in conjunction with the accompanying drawings, wherein FIG. 1 is a flowchart illustrating a method for processing a sequence of images and generating a new image of an extracted moving object rendered on a blurred background, according to an exemplary embodiment of the present invention;

FIG. 2 is a flowchart particularly illustrating a method for extracting a representation of a moving object from the sequence of images, according to an exemplary embodiment of the present invention;

FIG. 2B is a flowchart illustrating a method of obtaining a background image from the sequence of aligned images obtained by co-registering the sequence of images, according to an exemplary embodiment of the present invention;

FIG. 2C is a flowchart illustrating a method for generating a foreground mask from the sequence of aligned images obtained from co-registrations of the sequence of images, according to an exemplary embodiment of the present invention;

FIG. 3 is a flowchart illustrating a method for inserting the extracted foreground object into a blurred representation of the background image, according to an exemplary embodiment of the present invention;

DETAILED DESCRIPTION OF EXEMPLARY EMBODIMENTS

Exemplary embodiments of the present invention are disclosed in the following description.

According to an exemplary embodiment, the present invention is directed to a method and apparatus for receiving a sequence of images (e.g., digital photographic images taken in relatively rapid succession) depicting a foreground object moving in relation to a background scene. One example of this is a sequence or time series of images of a particular stretch of roadway, through which a car (or jogger, bicycle, object, etc.) is traveling. In such an example, the car (or jogger, bicycle, object, etc.) represents a moving foreground object, and the relatively stationary features in the sequence of images (e.g., the roadway, trees, road signs, sky, etc.) represent the background of the sequence of images. An exemplary embodiment of the present invention is directed to identifying and isolating a moving object from the background in the sequence of images.

Figure 5:
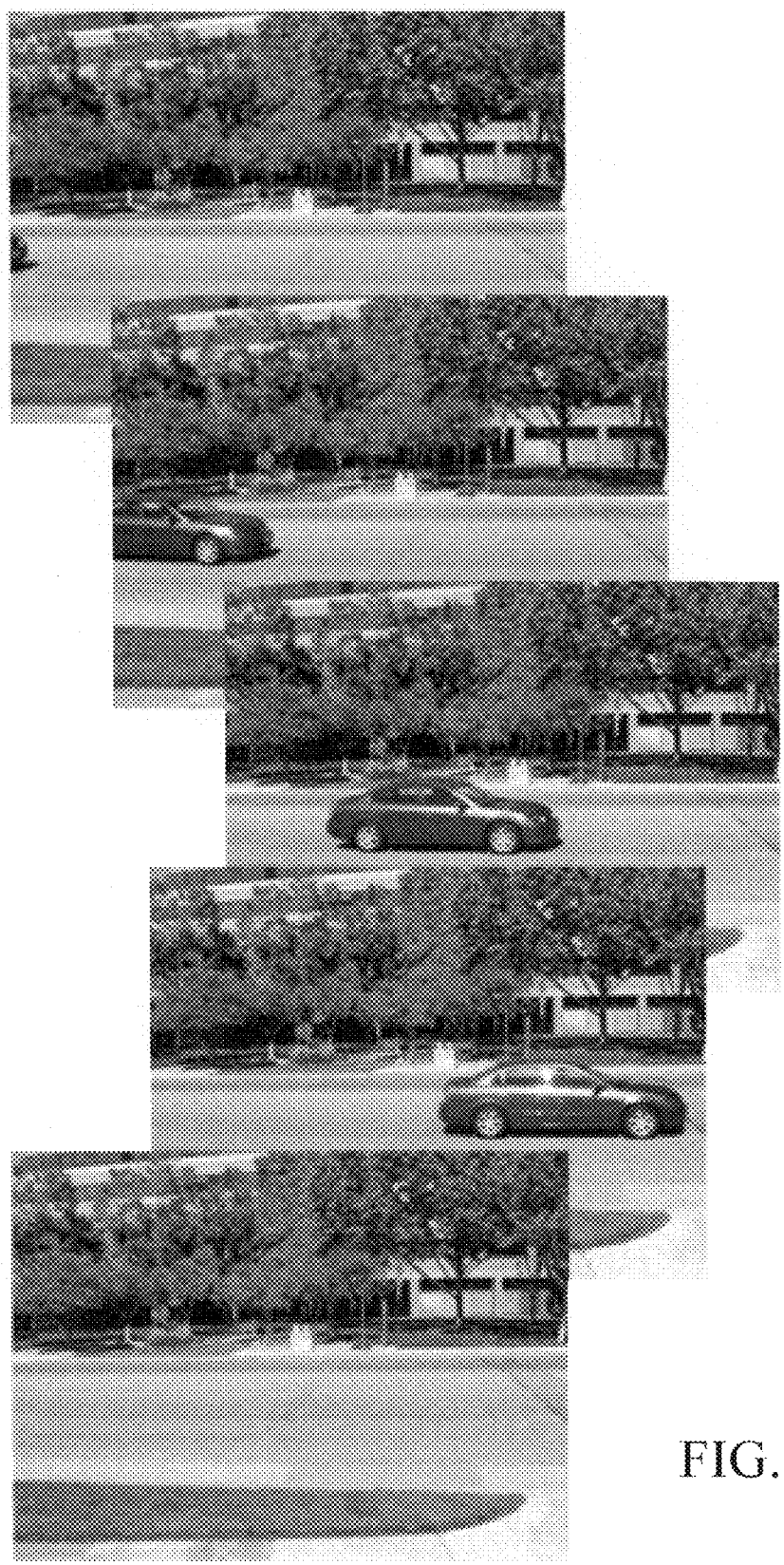
FIG. 5 illustrates an exemplary sequence of images to be processed, according to an exemplary embodiment of the present invention.

FIG. 5 illustrates an example of a sequence of images of a roadway through which a car is moving.

However, the present invention is not strictly limited to identifying a moving foreground object from a sequence of images depicting a stationary background. For example, it will be contemplated by those of ordinary skill in the art that a sequence of images may be captured of a stationary foreground object in such a manner (e.g., by changing camera angles and positions) as to change that object's relative position with respect to the background. In such a sequence, the present invention may be used for identifying and isolating the stationary foreground object from the background.

Thus, although the term "moving foreground object" or the like will be used hereinafter, such a term should not be strictly interpreted as requiring the object to be in motion as the sequence of images is captured. Instead, such a term is inclusive of any foreground object within a sequence of images whose relative position with respect to the background changes during the sequence of images.

Furthermore, the "background" of the sequence of images may actually include a depiction of various things that actually appear closer than the moving foreground object, given that such things are relatively stationary and do not change their position in relation to the other parts of the background.

According to an exemplary embodiment of the present invention, after identifying and isolating the moving foreground object from the sequence of images, a representation of that foreground object may be produced, along with a separate background image not containing the foreground object. Furthermore, the background image may be processed in order to apply visual effects to help convey the appearance of motion. According to a particular exemplary embodiment, the background image may be blurred in order to convey the appearance of motion. Thereafter, by superimposing the representation of the moving foreground object onto the processed (e.g., blurred) background image, a new image may be created in which the moving foreground object is depicted with sharpness and clarity, yet illustrated in such a manner as to appear to be presently in motion.

FIG. 1 is a flowchart illustrating a method for processing a sequence of images, according to an exemplary embodiment of the present invention. As illustrated in FIG. 1, the first step is obtaining a sequence of images (S10). According to an exemplary embodiment, the sequence of images is comprised of digital photographic or photo-quality images, such as those captured by a digital camera. However, the captured sequence of images may be produced by other means, as will be described in more detail hereinbelow in relation to FIG. 4. In step S20, a representation of a moving foreground object is extracted from the sequence of images. The extracted representation may itself constitute a stand-alone image of the moving foreground object, capable of use in other imaging applications. In the exemplary embodiment illustrated by FIG. 1, step S30 applies a blurring visual effect to the background image obtained from the sequence of images. In particular, this background image may be obtained in such a manner that the moving foreground object has been "erased," or at least substantially removed, from the background. In an exemplary embodiment, such a background image may be blurred by a process that convolves the background image with a blur filter. Thereafter, the extracted representation of the moving foreground object may be inserted into the blurred background image (S40) in order to synthesize an image for output.

Figure 4:
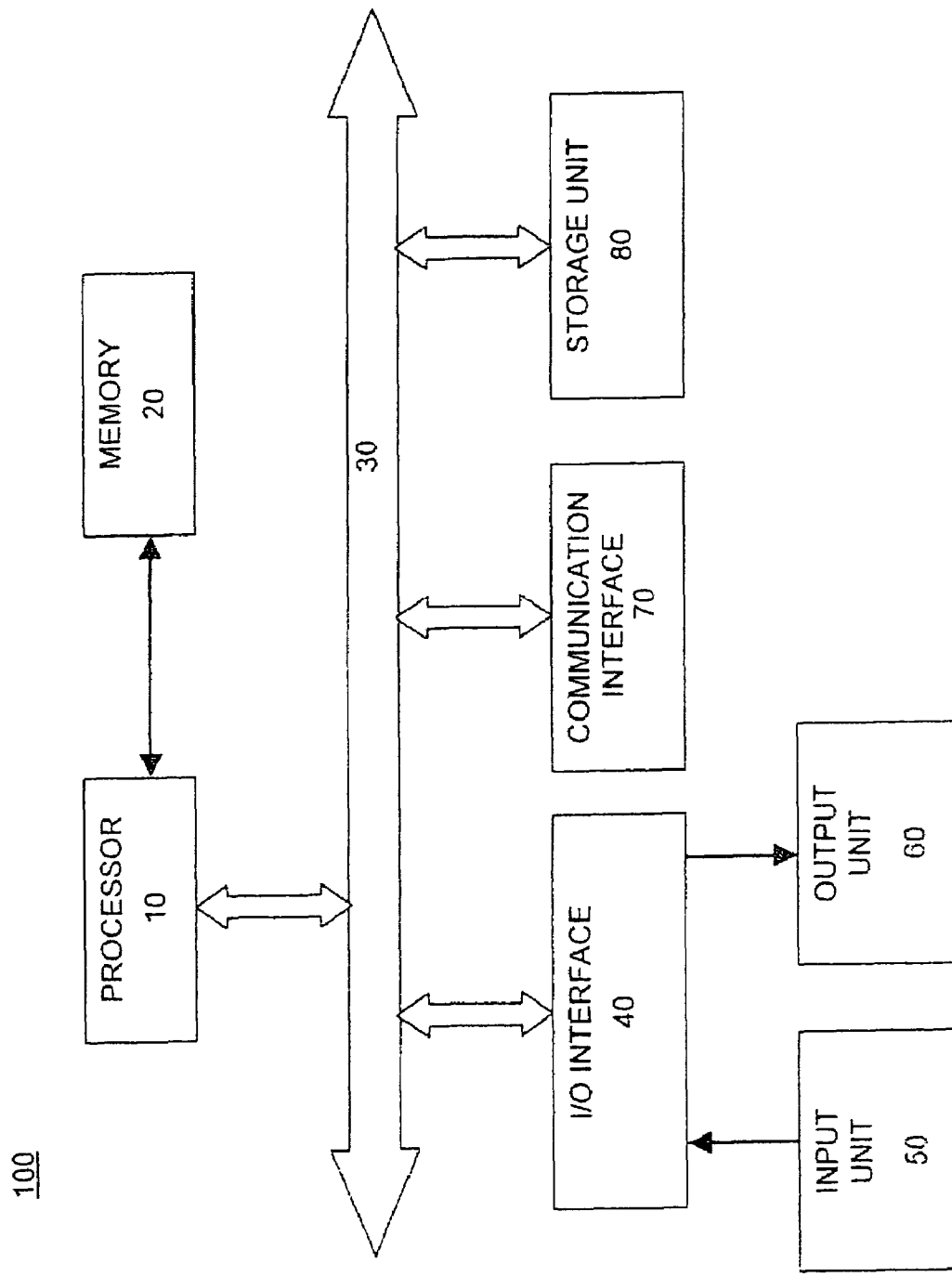
FIG. 4 illustrates an apparatus for performing image processing, according to an exemplary embodiment of the present invention of the present invention.

FIG. 4 is a block diagram illustrating an apparatus 100 for performing image processing on a sequence of images, according to an exemplary embodiment of the present invention. In particular, the apparatus 100 in FIG. 4 may be configured to perform the method illustrated in FIG. 1.

In an exemplary embodiment, the apparatus 100 may comprise a general purpose computer. As shown in FIG. 4, the apparatus 100 may be comprised of a processor 10 (e.g., microprocessor) capable of transferring data signal to/from a memory device 20. The processor 10 may also be connected to a databus 30, which allows the processor 10 to transfer data to/from other devices within the apparatus 100. In FIG. 4, these other devices include an input/output (I/O) interface 40, a communication interface 70, and a storage unit (e.g., hard drive) 80. The I/O interface 40 may include ports for receiving data signals from one or more input devices 50 and for sending data signals to one or more types of output devices 60.

As indicated above, the processor 10 may be a microprocessor implemented in a general purpose computer. However, there may be alternative embodiments in which the processor 10 is a specialized processing device, such as a digital signal processor (DSP) or the like. In an exemplary embodiment, the processor 10 is configured to perform the various steps and processes for performing image processing on a received sequence of images (e.g., the method illustrated in FIG. 1) according to a series of instructions embodied as computer program code. In such an embodiment, for example, the computer program code may be stored in the storage unit 80, such as a computer hard drive, an external Zip drive, or the like. Upon time of execution, at least some of the instructions in the computer program code may be transferred from the storage unit 80 via databus 30 to the processor 10. Such instructions may be temporarily stored in the memory 20, e.g., a random access memory (RAM), to be accessed and interpreted by the processor 10 during execution of the computer program code.

It will be readily apparent by those of ordinary skill in the art that such computer program code may be loaded into the apparatus 100 by means of various types of input devices 50 (e.g., a floppy disk inserted into a floppy disk drive) or via a communication network connected to the apparatus 100 via communication interface 70. However, those of ordinary skill in the art will also recognize that the computer program code may be embodied in the apparatus 100 by other means, such as a set of computer program instructions permanently stored in a particular type of memory 20, such as a read-only memory (ROM).

Furthermore, one or more of the steps described hereinbelow for processing a sequence of images may be performed by other means than execution of computer program code. For example, some steps or processes may be hard-wired into various components of the apparatus 100, as will be readily apparent to those of ordinary skill in the art.

As indicated above, the apparatus 100 is configured to receive a sequence of digital photo-quality images to be processed. Such a sequence of images may be received from different types of input devices 50. For example, a digital camera capable of capturing a series of images in rapid succession may be connected to the I/O interface 40 via Universal Serial Bus (USB) interface. On the other hand, the input device 50 may be an apparatus for digitizing analog video or television signals conveying a sequence of images. As such, the I/O interface 40 may communicate data signals representing the sequence of digital images from the input device 50 to the databus 30. The sequence of images may be stored in the storage unit 80 and transferred to the processor 10 when image processing is performed.

According to another exemplary embodiment, the sequence of digital image signals may be received by the apparatus 100 via a network. As such, the sequence of images may be received by the communication interface 70 from such a network. For example, the sequence of images may be received from a server connected to the internet, a local area network (LAN) or a wide area network (WAN). The communication interface 70 may support wireless and/or wire line network connections in order to receive the sequence of images. After receiving the sequence of images, the communication interface 70 may send the data signals representing the sequence of images to the databus 30 to be transferred to the storage unit and/or the processor 10.

Now, a more detailed discussion will be provided below regarding the various steps and processes illustrated in the flowchart of FIG. 1. As shown in FIG. 1, after the sequence of images have been input or otherwise obtained (S10), a moving foreground object is identified from the sequence of images and a representation of that object is extracted, according to S20. This step S220 is generally referred to as "motion segmentation".

FIG. 2 is a flowchart illustrating a method for performing the motion segmentation described in step S20 of FIG. 1, according to an exemplary embodiment. Initially, the images within the sequence must be co-registered in order to align the images to a common coordinate system, according to step S210. This step S210 produces a series of images that are aligned so that scene points lie at the same pixel locations within each image. Thereafter, the step of obtaining a background image from the series of aligned images is performed according to S220. Further, S230 refers to a process of choosing one of the series of aligned images, and using both the chosen image and the background image to generate a foreground mask. This foreground mask may be applied to the chosen aligned image in order to complete the process of extracting a representation of the moving foreground object (shown in S240).

A more detailed description of steps S210-S230 will be described below in connection with FIGS. 2A-2C.

Figure 2A:
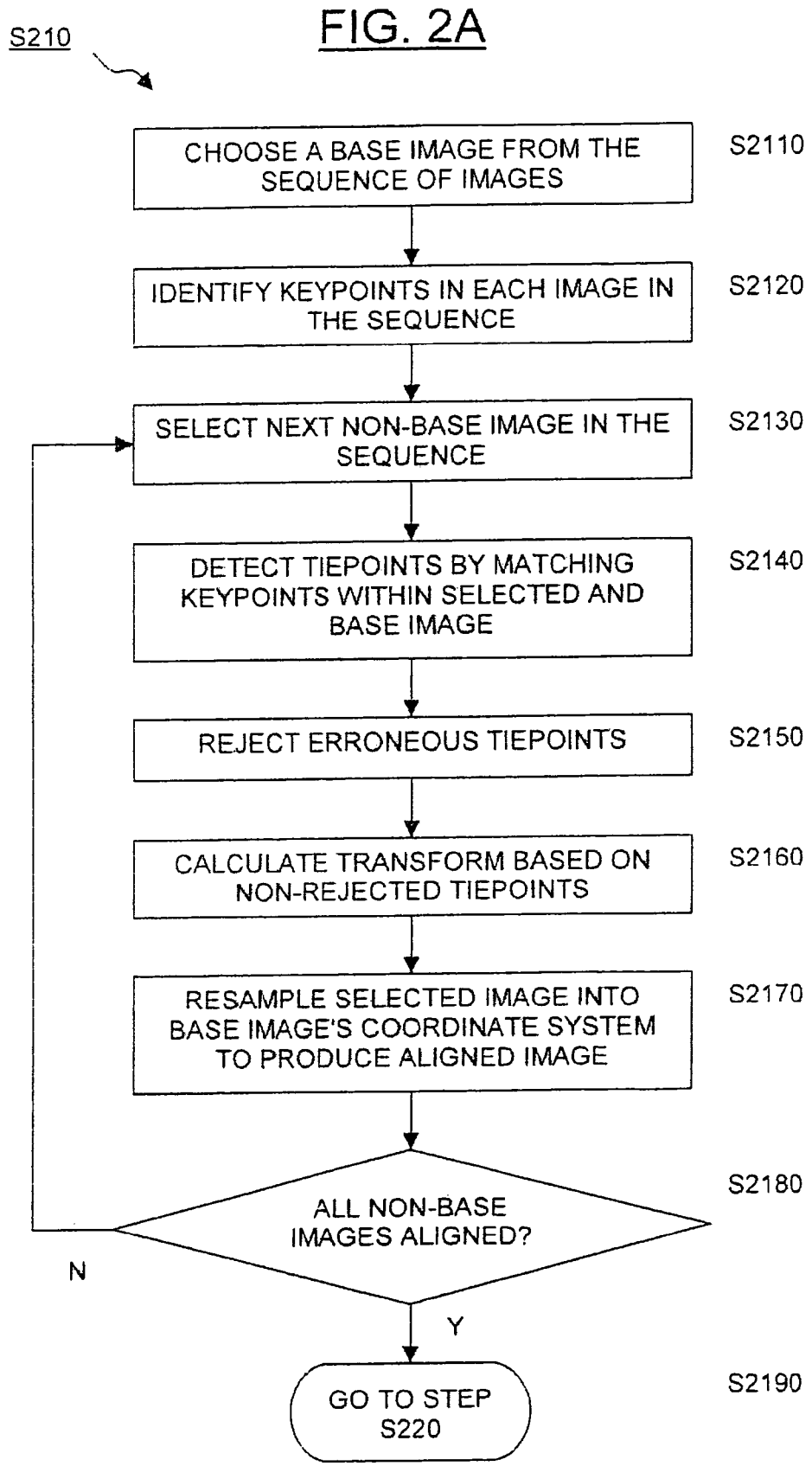
FIG. 2A is a flowchart illustrating a method for co-registering the sequence of Images in order to obtain a set of aligned images, according to an exemplary embodiment of the present invention.

FIG. 2A is a flowchart illustrating a method for co-registering a sequence of images in order to produce a series of aligned images, as specified in step S210 of FIG. 2. Such co-registration may be necessary because in many instances, e.g., where a handheld camera is used, movement between shots may be inevitable. Thus, there may be movement within the sequence of various background points, which should remain stationary. Co-registration of the sequence of images helps solve this problem by ensuring that background features (i.e., image features not part of the moving foreground object) lie at the same points of a common coordinate system (i.e., same pixel locations). According to an exemplary embodiment, a common coordinate system may be determined by choosing a base image from the sequence of images. Thereafter, by co-registering or aligning each of the remaining images in the sequence to the base image, pair-wise, a series of images aligned to the base image's coordinate system may be obtained.

For example, assume that the sequence of images includes n images ($I_1 \ldots I_n$). As illustrated in FIG. 2A, a particular one of these images is chosen as the base image $I_B$ ($1 \leq B \leq n$) to which each of the non-base images $I_x$ ($x \in 1, \ldots, n; x \neq B$). It would be advantageous to choose the base image $I_B$ to contain a relatively high number of tiepoints with respect to the various non-base images $I_x$ as possible. "Tiepoints" refer a pair of point in two respective images, which correspond to the same image feature or scene point. A more detailed description of identifying tiepoints will be described below in connection with step S2140.

According to S2120 in FIG. 2A, it will be necessary to identify the keypoints in each image of the sequence of images $I_1 \ldots I_n$. A "keypoint" refers to a distinctive image feature. According to an exemplary embodiment, the keypoints should be those features that are readily identifiable regardless of variations that may occur to the background within the sequence of images $I_1 \ldots I_n$. For instance, these might include keypoints that could be identified despite variations in image scale and rotation with respect to the background.

For instance, there is a process described in an article by David Lowe, entitled "Object Recognition from Local Scale-Invariant Features," *Proc. Of the International Conference on Computer Vision* (September 1999), the entire contents of which are incorporated herein by reference, which may be applied on a set of images to identify keypoints that are invariant to image scaling and rotation. This process, referred to as Scale Invariant Feature Transform (SIFT), is a very effective way for identifying invariant keypoints within the sequence of images. However, it will be readily apparent to those of ordinary skill in the art that there are numerous methods for identifying interesting or distinguishing image features (i.e., keypoints) that remain relatively invariant within a received sequence of images. In exemplary embodiments of the present invention, any one of these methods may be used to identify the keypoints in accordance with step S2120 of FIG. 2A.

In the relevant art, keypoints are more generally referred to as "interest points" or "local descriptors." There is a wide range of image transformations that can be used for generating local descriptors including (but not limited to): SIFT, PCA-SIFT, shape context, moment invariants, cross-correlation, steerable filters, differential invariants, and complex filters. Research has shown that SIFT and a variant thereof outperform other types of descriptors. See K. Mikolajczyk & C. Schmid, "A Performance Evaluation of Local Descriptors," which is available at http://lear.inrialpes.fr/pubs/2005/MS05/mikolajczyk pami2004.pdf (accessed Sep. 1, 2005), the entire contents of which are incorporated herein by reference). While using SIFT may have advantages, the present invention is not thereby limited. Any of the above-mentioned image transformations may be used in the present invention for identifying keypoints or local descriptors in each image of the sequence, as well as other methods for generating keypoints that will be contemplated by those of ordinary skill in the art.

After the keypoints have been identified for each image in the sequence (S2120), a series of steps (S2130-S2180) are performed to align each of the non-base images $I_x$ pair-wise to the chosen base image $I_B$. As shown in FIG. 2A, after the next non-base image $I_x$ is selected for co-registration (S2130), tiepoints are detected within the selected non-base image $I_x$ and the base image $I_B$ by matching up keypoints in each. In other words, a pair of pixel locations in the selected non-base image $I_x$ and the base image $I_B$, respectively, is detected as tiepoints if they contain the same keypoint. This step is illustrated in S2140. Those of ordinary skill in the art will recognize that there are various methods for matching up keypoints in order to detect the corresponding tiepoints within the selected image $I_x$ and the base image $I_B$.

However, it should be noted that the processing performed according to S2120-S2140 may detect a number of erroneous tiepoints. Accordingly, as shown in S2150, it may be necessary to perform a process for rejecting erroneously detected tiepoints. In an exemplary embodiment, the error rejection process may be performed by applying a model parameter estimation process on the detected tiepoints. For example, a process known as Random Sample Consensus (RANSAC) may be used as the model parameter estimation process for rejecting erroneous tiepoints. RANSAC is described in an article by M. A. Fischler et al., "Random Sample Consensus: A Paradigm for Model Fitting with Applications to Image Analysis and Automated Cartography," *Communications of the ACM* (June 1981), which is incorporated herein by reference in its entirety.

However, it will be readily apparent to those of ordinary skill in the art that other model fitting or parameter estimation methods may be used in the present invention for purposes of detecting and rejecting erroneous tiepoints. Such methods may include, but are not limited to, least squares, iterative least-squares, least-median-of-squares, and M-estimators.

Referring again to FIG. 2A, S2160 indicates that the non-rejected tiepoints are used for calculating a homography, i.e., a mathematical transform for mapping the coordinates in the selected non-base image $I_x$ into the coordinate system of the base image $I_B$. This mathematical transform $T_x$ maps the pixel locations in the selected non-base image $I_x$ to the equivalent pixel locations in the base image's $I_B$ frame of reference.

As indicated in block S2170, the calculated transform $T_x$ may thereafter be applied to pixels in the non-base image $I_x$ in order to resample that image into the coordinate system of the base image $I_B$. This resampling produces a new image $A_x$ that is aligned with the base image $I_B$. Thus, co-registration has been performed on the non-base image $I_x$ with respect to the base image $I_B$. As illustrated in S2180, the next non-base image $I_{x+1}$ is selected for co-registration with the base image $I_B$, until all non-base images have been co-registered. Thereafter, processing continues to step S220 in FIG. 2 in order to obtain the background from the aligned images.

Figure 6:
FIG. 6 illustrates an exemplary result of co-registering images in FIG. 5, according to an exemplary embodiment of the present invention.

FIG. 6 illustrates an exemplary result of aligning the sequence of images of FIG. 5. Specifically, FIG. 6 illustrates a set of co-registered images superimposed on one another.

FIG. 2B is a flowchart illustrating a method for obtaining a background image, according to step S220. As shown in S2210, a particular one of the sequence of aligned images, which are generated as a result of co-registration (S210 in FIG. 2A) is chosen. According to an exemplary embodiment, the base image $I_B$ may be used as the chosen aligned image. Alternatively, one of the non-base images $I_x$, which was resampled into the base image's $I_B$ coordinate system, may also be chosen. In particular, this chosen image will provide the frame of reference for generating the background image. In other words, the background image will be generated to have pixel values corresponding to the pixel locations within the chosen image.

In an exemplary embodiment, the chosen image may be chosen as the particular one of the aligned images $A_1 \ldots A_n$ that depicts the moving foreground object in the "best" position. For example, the chosen aligned image (referred to hereafter as "$A_C$") may be the one that contains the moving foreground object closest to the center of the image. Thus, an image close to the middle of the time series sequence may be chosen. However, if the representation of the moving foreground object is intended to be closer to one of the borders of the final output image, the chosen image $A_c$ may be chosen as an aligned images $A_1 \ldots A_n$ close to either the beginning or end of the time sequence.

It will be readily apparent to those of ordinary skill in the art how to choose the correct aligned image $A_C$ from the sequence of aligned images $A_1 \ldots A_n$ according to the particular needs of the application. It need only be pointed out that, according to an exemplary embodiment of the present invention, the location of the moving foreground object within the chosen image $A_C$ may determine the location of the moving foreground object representation within the final image (e.g., the image with the blurred background).

According to the exemplary embodiment illustrated in FIG. 2B, the background image may be generated by obtaining the median pixel intensity value from the set of aligned images $A_1 \ldots A_n$ corresponding to each pixel location within the chosen image $A_c$. This strategy assumes that the moving foreground object moves rapidly enough through the sequence of images so that the median of the pixel values corresponding to each pixel location within the sequence of images will depict a part of the background, rather than part of the moving foreground object.

Blocks S2220-S2260 of FIG. 2B illustrate the method by which the median values are obtained from the sequence of aligned images $A_1 \ldots A_n$. Specifically, each aligned image $A_x$ is selected (step S2220) and the pixel values corresponding to each pixel location in the chosen image $A_C$ is obtained (S2230). After the pixel values have been obtained from the last aligned image $A_n$, according to S2240, there will be a series of pixel values $PV_1 \ldots PV_n$ for each pixel location L. As illustrated in S2250, the median pixel value from the series of pixel values $PV_1 \ldots PV_n$ may be determined. This determined median value may then be used as the pixel intensity value for corresponding pixel location L in the background image, as shown in S2260. After the median values have been obtained for all pixel locations, the background image is generated. Thereafter, the foreground mask may be generated according to step S230 in FIG. 2.

Figure 7:
FIG. 7 illustrates an exemplary background image generated from the sequence of images of FIGS. 5 and 6, according to an exemplary embodiment of the present invention.

FIG. 7 shows an exemplary background image generated from the sequence of images in FIG. 5, after they are aligned (see FIG. 6).

It should be noted that FIG. 2B merely illustrates one exemplary embodiment for generating the background image. It will be readily apparent to those of ordinary skill in the art that other methods are available for generating the background image from the sequence of aligned images $A_1 \ldots A_n$. For instance, during the co-registration process (S210 in FIGS. 2 and 2A), tiepoints may be detected for the moving foreground object in addition to the background. Thereafter, these detected tiepoints may be used to make a preliminary estimate of the moving foreground object, and generate a foreground color histogram of the moving foreground object. As such, a probabilistic method may be performed to determine whether each pixel location L within the chosen image $A_C$ corresponds to the background or the moving foreground object based on the corresponding pixel intensity values in the sequence of aligned images $A_1 \ldots A_n$ and the foreground color histogram.

It should be noted that the present invention is not limited to any particular method for generating or estimating the background image. Instead, exemplary embodiments of the present invention contemplate any method for estimating or generating the background image from a sequence of received images, as will be readily contemplated by those of ordinary skill in the art.

Referring again to FIG. 2, after the background image has been obtained according to S220, the next step is to generate a foreground mask from the chosen image $A_C$ as illustrated in S230.

FIG. 2C is a flowchart illustrating a method for generating the foreground mask from the chosen aligned image $A_C$. According to an exemplary embodiment, the foreground mask may be generated as the difference in pixel values between the chosen image $A_C$ and the generated background image. Specifically, the pixel values in the chosen image $A_C$ may be subtracted from the corresponding pixel values (i.e., at the same pixel locations) in the background image, as illustrated in S2310, to obtain a set of difference values. In step S2320, the absolute value is determined for each difference value thus obtained. Thus, a foreground image is generated, in which the absolute values are set as the pixel intensity values PV for their corresponding pixel locations L. The foreground image may then be converted to grayscale, according to S2330.

Thereafter, the grayscale foreground image may be binarized according to the process illustrated in blocks S2240-S2360 in FIG. 2C. Specifically, the binarization process is performed by "thresholding" each of the pixels in the foreground image. Specifically, each pixel location L is selected (S2240), and the corresponding pixel intensity value $PV_L$ is compared to a predetermined threshold value. As shown in step S2350, if the pixel value $PV_L$ is greater than or equal to the threshold value, it is replaced with a value of one (1). If, on the other hand, the pixel value $PV_L$ is less than the threshold value, it is replaced with a value of zero (0). According to an exemplary embodiment, this threshold value may be chosen in order to minimize the intra-class variance of the black and the white pixels, as discussed in the article by N. Otsu, "A Threshold Selection Method from Gray-Level Histograms," *IEEE Transactions on Systems, Man, in Cybemetics*, Vol. 9, No. 1, pp. 62-66 (1979), which is incorporated herein by reference in its entirety. However, many other methods for thresholding the pixels may be used, as will be contemplated by those of ordinary skill of the art, may be applied. For example, a survey of such methods is available at http://tinyurl.com/719vm (accessed Sep. 1, 2005).

After each of the pixel locations L have been thresholded (by determined in S2360), the resultant binarized foreground image (hereafter referred to as a "binarized foreground mask") will have a value of one (1) for foreground pixels, and a value of zero (0) for background pixels.

However, this binarized foreground mask may contain some noise signal for a couple of reasons. Specifically, certain features within the background image (tree leaves, grass, bushes, etc.) may shift while the sequence of images is being captured. Also, the depiction of the foreground object within the binarized foreground mask may contain certain "holes" due to the fact that the background images is nearly the same color as the foreground object.

Accordingly, a process for refining the binarized foreground mask may be performed according to step S2370. According to an exemplary embodiment, such refining may be performed by applying morphological filtering on the binary signal (the 0/1 pixel values) in the binarized foreground mask. Such morphological filtering may be sufficient to remove excessive noise generated by the shifting of background barriers in the sequence of images. Also, since a general shape may be assumed for the moving foreground object, the morphological filtering may be sufficient to fill in the holes in the binary pixels representing the foreground object in the foreground mask.

A more detailed description of morphological filtering (MF) will now be provided. MF is a non-linear filtering technique applied to binary images to fill in holes and remove noise. MF requires the selection of two parameters: the structuring element (analogous to the kernel in linear filtering), and, the operation type ("opening" and "closing" are the relevant types for purposes of the present invention).

Figure 8:
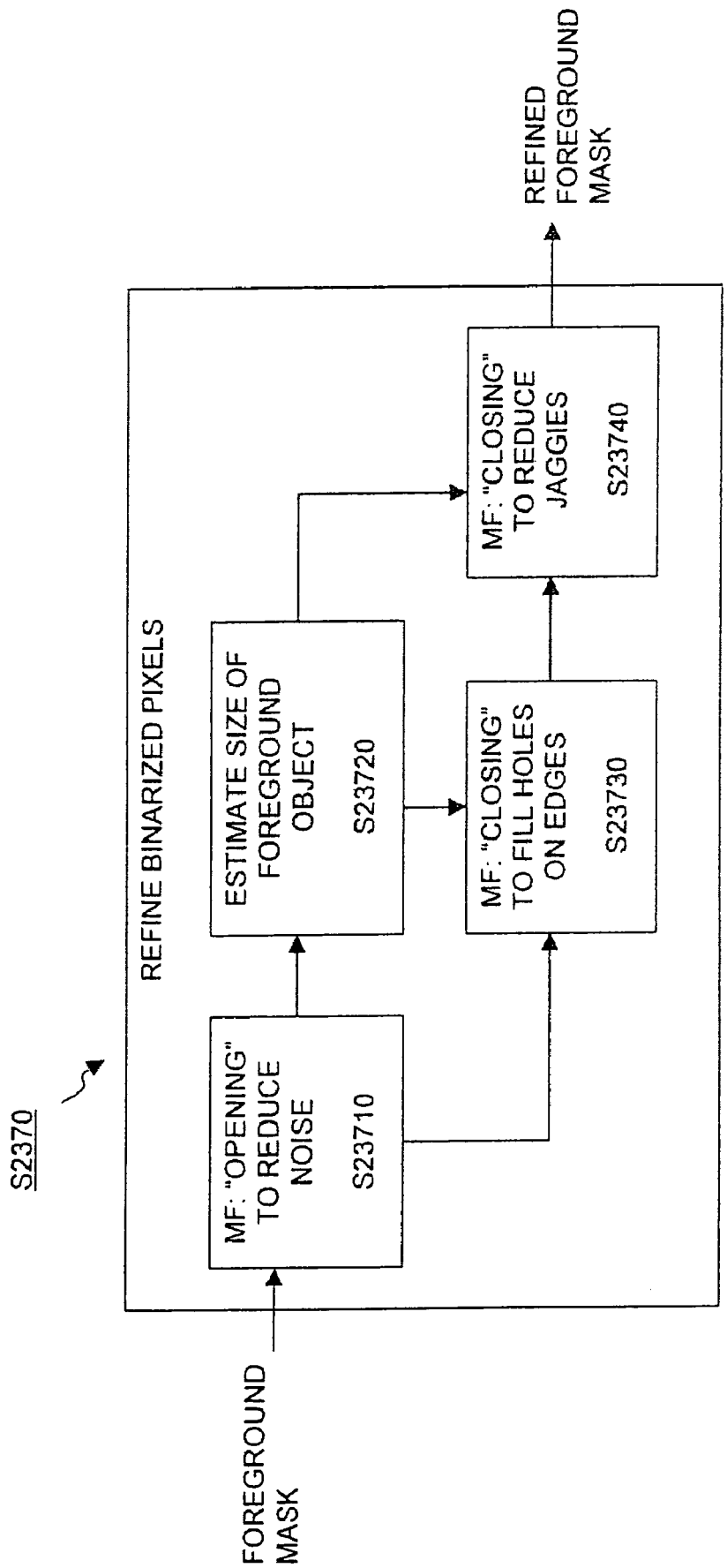
FIG. 8 illustrates morphological filtering operations for refining binarized pixels in a foreground mask, according to an exemplary embodiment of the present invention.

According to an exemplary embodiment of the present invention, several MF operations may be applied to the binarized foreground mask, as illustrated in FIG. 8, in order to refine the binary pixels according to step S2730. An "opening" operation may be applied (S23710), using a disk structuring element of an appropriate diameter for the structuring element, to reduce noise at isolated points. Further, a size (diameter) of the foreground object may be estimated (S23720). As shown by S23730, to fill "dips" or holes in the horizontal and vertical edges, a MF closing operation may be performed on the foreground mask using a rectangular structuring element whose size is based on the estimated size of S23720. To reduce any "jazzies" effect introduced by the aforementioned closing operation, S23740 shows that another closing operation may be performed on the foreground mask using a disk structuring element, whose size is also based on the estimated size of S23720.

It should be noted that the operations shown in S23710, S23730, and S23740 represent an MF sequence tuned for a particular class of foreground objects. Accordingly, the present invention should not be limited in terms of the number or type of MF operations, nor the type of structuring elements used in order to accommodate different types of foreground objects. The choice of structuring elements, as well as implementation of other parameters associated with the morphological filtering operations, will be readily ascertainable by those of ordinary skill in the art.

As illustrated in FIG. 2C, after the pixels in the binarized foreground mask have been refined, block S2380 indicates that the generated foreground mask is ready to be applied to the chosen image $A_C$, in accordance with step S240 of FIG. 2.

Specifically, the foreground mask is applied by multiplying the binary pixel values (0/1) of the foreground mask to the corresponding pixel intensity values $PV_L$ Of the chosen image $A_C$. As a result of this multiplication, every pixel in the chosen image $A_C$ that corresponds to the background will be "zeroed out" (i.e., multiplied by 0), leaving only the pixel values corresponding to the foreground object to be unaltered (i.e., multiplied by one). Thus, as a result of step S240, motion segmentation has been performed and a representation of the moving foreground object is obtained.

Referring back to FIG. 1, after this representation of the moving object has been extracted in accordance with S20, the next step is to apply visual processing (e.g., blurring) on the background image (S30). According to an exemplary embodiment, the background image may be blurred through convolution with a blur filter H. It will be readily apparent to those of ordinary skill in the art how to determine the specific parameters of the blur filter H, to achieve the necessary effects.

For instance, horizontal blurring may be achieved by convolving the background image with a kernel comprised of a one row by N column matrix, such as $H = 1/N \cdot (1, 1, 1, \ldots, 1)$ where N is the number of ones (1s). A longer filter (i.e., higher value of N) may be chosen to create a stronger blurring effect. Basically, such convolution has the effect of causing pixels in the background to be shifted horizontally and added to the original background image.

According to a further exemplary embodiment, the blurring process may be enhanced by estimating the actual direction of the moving foreground object from the tiepoints detected during the co-registration process (as described above in connection with S2140 of FIG. 2A). In other words, some of the tiepoints erroneously detected for the background (and rejected according to S2150 of FIG. 2A) may actually correspond to matches on the foreground object that can be used to infer the objects' direction of motion. Other enhancements to the blurring process may be implemented without departing from the spirit and scope of the present invention, as will be readily contemplated by those of ordinary skill in the art.

Once the background image has been blurred (or other visual effects have been applied), step S40 in FIG. 1 indicates that the extracted representation of the moving foreground object may be inserted into the blurred background in order to produce an output image. FIG. 3 is a flowchart illustrating a method for performing step S40, according to an exemplary embodiment of the present invention.

Figure 9:
FIG. 9 illustrates a representation of a car extracted from the sequence of images of FIG. 5 superimposed on a blurred background, according to an exemplary embodiment of the present invention.

As shown in S410 of FIG. 3, the binarized foreground mask may be inverted, thereby causing all of the pixels corresponding to the foreground object to have a zero value (0) and all of the pixels relating to the background area to have a one value (1). The binary pixels in the inverted foreground mask may be multiplied with the corresponding pixels in the blurred background image in order to zero out an area for the moving foreground object (shown in S420). Thus, the extracted representation of the moving foreground object may be superimposed on this zeroed-out area in the blurred background image in order to complete the process of generating the output image, as illustrated by steps S430 and S440. An example of this is illustrated in FIG. 9, in which an extracted representation of the car in the sequence of images in FIG. 5 is superimposed on a blurred background.

Referring to FIG. 4, the apparatus 100 of the present invention may output the resultant image using any of a number of different output devices 60, such as a video screen or a printer. Furthermore, the apparatus 100 may be configured to transmit the output image via a network connected to the communication interface 70 to other types of devices. Also, the apparatus 100 may store this output image in the storage unit 80 for future use.

Although exemplary embodiments have been described hereinabove in connection with the figures, these figures are provided for purposes of illustration only and should not be used to limit the present invention. For instance, the present invention is not limited to the sequence of steps illustrated by any flowchart in figures, nor is the present invention limited to any particular configuration or arrangement in the figures. It should be noted that the present invention covers any and all variations that may be made to the exemplary embodiments described hereinabove, which do not depart from the spirit and scope of the present invention. Such variations may include the omission of certain described method steps and/or the replacement of such steps with equivalent steps, as will be contemplated by those of ordinary skill in the art.

What is claimed is:

1. A method for extracting a moving object representation from a series of images comprising:
    causing one or more processors to perform the steps of:
        aligning each of the images in the series to a common coordinate system;
        obtaining a background image from the aligned images;
        extracting the moving object representation from a particular image of the aligned images based on the background image; and
        detecting tiepoints among the images in the series,
    wherein the images in the series are aligned so that the detected tiepoints coincide in the common coordinate system.

2. The method of claim 1, further comprising causing the one or more processors to perform the step of:
    identifying keypoints in each of the images in the series,
    wherein each of the detected tiepoints corresponds to matching keypoints among the images.

3. The method of claim 1, further comprising causing the one or more processors to perform the step of:
    applying a model parameter estimation process on the detected tiepoints to reject erroneous tiepoints.

4. The method of claim 3, wherein the utilized model parameter estimation process utilizes random sample consensus (RANSAC).

5. The method of claim 1, wherein the images in the series, which include a base image, are aligned by causing the one or more processors to perform the steps of:
    calculating a transform for mapping coordinates in each of the non-base images in the series to the base image's coordinate system; and
    resampling each of the non-base images into the base image's coordinate system using the calculated transform, thereby aligning the images in the series.

6. The method of claim 1, wherein the obtaining a background image includes causing the one or more processors to perform the step of determining, for each of a plurality of pixel positions in the particular image, a median value from the corresponding pixels in the aligned images.

7. The method of claim 6, wherein the obtaining a background image includes causing the one or more processors to perform the steps of:
    generating a foreground color histogram based on the detected tiepoints in the images that correspond to the moving object representation; and
    calculating a background probability for each of a plurality of pixel positions in the particular image based on: corresponding pixel values in the aligned images, and the foreground color histogram.

8. The method of claim 1, wherein the extracting the moving object representation includes causing the one or more processors to perform the steps of:
    for each of a plurality of pixel positions in the particular image, subtracting a pixel value in the particular image from a corresponding value in the background image to obtain a foreground image;
    converting the foreground image to grayscale;
    generating a binarized foreground mask; and
    multiplying pixel values in the particular image with corresponding values in the binarized foreground mask.

9. The method of claim 8, wherein the generating a binarized foreground mask includes causing the one or more processors to perform the steps of:
    applying a threshold to pixels in the converted foreground image; and
    applying morphological filtering on a signal produced by applying the threshold.

10. The method of claim 8, further comprising causing the one or more processors to perform the step of:
    inserting the extracted moving object representation into a blurred background image.

11. The method of claim 10, wherein the blurred image is obtained by causing the one or more processors to perform the step of convolving the background image with a blur filter to obtain a blurred background image.

12. The method of claim 10, wherein the inserting the extracted moving object representation includes causing the one or more processors to perform the steps of:
    inverting the foreground mask;
    zeroing out an area in the blurred background image by multiplying pixel values in the blurred background image with corresponding values in the inverted foreground mask; and
    superimposing the extracted moving object representation onto the zeroed out area.

13. A computer program product including a computer program code physically embodied on a computer readable medium, the computer program code, when executed, causing one or more computers to:
    receive a series of images;
    align each of the images in the series to a common coordinate system;
    obtain a background image from the aligned images;
    extract a moving object representation from a particular image of the aligned images based on the background image; and
    detect tiepoints among the images in the series,
    wherein the images in the series are aligned so that the detected tiepoints coincide in the common coordinate system.

14. The computer program product of claim 13, wherein the computer program code further causes the one or more computers to:
    identify keypoints in each of the images in the series,
    wherein each of the detected tiepoints corresponds to matching keypoints among the images in the series.

15. The computer program product of claim 13, wherein the computer program code further causes the one or more computers to:

apply a model parameter estimation process on the identified tiepoints to reject erroneous tiepoints.

16. The computer program product of claim 13, wherein, in order to align the images, which include a base image, the computer program code causes the one or more computers to:

calculate a transform for mapping coordinates in each of the non-base images in the series into the base image's coordinate system; and resample each of the non-base images into the base image's coordinate system using the calculated transform thereby aligning the images in the series.

17. The computer program product of claim 16, wherein, in order to obtain the background image, the computer program code causes the one or more computers to:

determine, for each of a plurality of pixel positions in the particular image, a median value from the corresponding pixels in the aligned images.

18. The computer program product of claim 13, wherein, in order to extract the moving object representation, the computer program code causes the one or more computers to:

for each of a plurality of pixel positions in the particular image, subtract a pixel value in the particular image from a corresponding value in the background image to obtain a foreground image;

convert the foreground image to grayscale;

generate a binarized foreground mask; and multiply pixel values in the particular image with corresponding values in the binarized foreground mask.

19. The computer program product of claim 18, wherein, in order to generate a binarized foreground mask, the computer program code causes the one or more computers to:

apply a threshold to pixels in the converted foreground image; and apply morphological filtering on a signal produced by applying the threshold.

20. The computer program product of claim 18, wherein the computer program code further causes the one or more computers to:

insert the extracted moving object representation into a blurred background image, the blurred background image being obtained by convolving the background image with a blur filter to obtain a blurred background image.

* * * * *